United States Patent [19]

Takei et al.

[11] Patent Number: 5,096,744
[45] Date of Patent: Mar. 17, 1992

[54] GRANULATING AND COATING APPARATUS AND GRANULATING AND COATING METHOD USING THE SAME

[75] Inventors: Narimichi Takei, Sugito; Nagahiko Tanaka, Sakado; Kazuomi Unosawa, Adachi, all of Japan

[73] Assignee: Freund Industrial Co., Ltd., Tokyo, Japan

[21] Appl. No.: 547,933

[22] Filed: Jul. 3, 1990

[30] Foreign Application Priority Data

Jul. 7, 1989 [JP] Japan .................. 1-176921

[51] Int. Cl.$^5$ ............................. B02C 23/26
[52] U.S. Cl. ...................... 427/213; 241/18; 241/39; 241/5; 118/303
[58] Field of Search ............ 241/5, 18, 25, 39; 427/213; 118/303

[56] References Cited

U.S. PATENT DOCUMENTS

| | | | |
|---|---|---|---|
| 3,376,124 | 4/1968 | Hollingsworth | 241/5 X |
| 4,592,302 | 6/1986 | Motoyama et al. | 241/5 X |
| 4,740,390 | 4/1988 | Kulling | 427/213 |
| 4,749,595 | 6/1988 | Honda et al. | 427/213 |
| 4,804,146 | 2/1989 | Nied et al. | 241/5 |
| 4,848,673 | 7/1989 | Masuda et al. | 241/5 |

Primary Examiner—Mark Rosenbaum
Assistant Examiner—Frances Chin
Attorney, Agent, or Firm—Kane, Dalsimer, Sullivan, Kurucz, Levy, Eisele and Richard

[57] ABSTRACT

A method of performing granulating, coating, drying of a powdry or granular material having a relatively minute particle diameter and an apparatus therefor. A nozzle for supplying the powdery or granular material and a nozzle for supplying a coating liquid are parallelly provided at adjacent positions where air streams dispersed from the both nozzles are not in contact with each other and directed to the interior of a processing cylinder. The two nozzles are connected to compressed air sources independently of each other. Drying airstream blow-in openings are provided on the way from collision of the powdery or granular material and the coating material to catching thereof. Drying air streams are supplied from a direction tangent to the processing cylinder having a circular section.

6 Claims, 2 Drawing Sheets

GRANULATING AND COATING APPARATUS AND GRANULATING AND COATING METHOD USING THE SAME

BACKGROUND OF THE INVENTION

1. Field of the Invention

This invention relates to granulating and coating techniques and more particularly to techniques effective for use in the granulating, coating, drying, etc. of a powdery or granular material having a relatively minute particle diameter.

2. Related Art Statement

In general, as the granulation coating techniques of the type described, such an arrangement is thought of that a raw powdery or granular material as being an article to be coated and coating liquid as being a coating material are supplied from positions opposed to each other in a diameter direction of the apparatus, and drying air streams such as hot air are supplied from the underside thereof.

Now, in the aforesaid techniques, the article to be coated and the coating material collide against each other from the directions opposed to each other. Moreover, in this type of collision against each other from the opposed directions, due to the imbalance in flow-out forces of the article to be coated and of the coating material, one of the article and the coating material tends to become stronger in the force of collision than the other.

For this reason, for example, when the blow-out force of the coating material is stronger than that of the article, such disadvantages tend to occur that the coating material adheres to the opposed inner wall surface of the apparatus and is solidified thereon, or the article adheres to the coating material before the coating material is solidified, and is accumulated thereon.

Furthermore, there is a fear that such a disadvantage may occur that, due to the imbalance in the blow-out forces or blow-out flow rates, the coating liquid itself is turned into solid particles due to a so-called "spray-dry" phenomenon, without adhering onto the article to be coated.

SUMMARY OF THE INVENTION

It is an object of the present invention to provide techniques capable of performing reliable granulation coating.

It is another object of the present invention to provide techniques capable of preventing adhering and solidification of the coating material on the opposed inner wall surface, or turning the coating material into particles due to the so-called "spray-dry" phenomenon.

The above-described and other objects and the novel characteristics of the present invention will be made further apparent from the following description and the accompanying drawings.

The outline of the typical apparatus according to the present invention is briefly described as follows.

Namely, the granulating and coating apparatus and granulating and coating method using the same according to the present invention are arranged such that the drying air streams are supplied on the way from the collision of the article to be coated and the coating material to the catching of the coated article.

Furthermore, respective means of supplying the article to be coated and the coating material can be parallelly provided at adjacent positions where air streams dispersed form the two supply means but are not in contact with each other.

With the granulating and coating apparatus and granulating and coating method using the same according to the present invention, the article to be coated and the coating material are not expelled to the opposed inner wall surfaces from opposed directions, so that adhering and solidificaton of the article to be coated and/or the coating material to the opposed inner wall surfaces due to an imbalance in the opposed blow-out forces, or an accumulation of the coating material, which is turned into solid particles due to the "spray-dry" phenomenon are prevented from occurring, thus enabling the performance of reliable granulation and coating.

DETAILED DESCRIPTION OF THE PREFERRED EMBODIMENTS

Figure 1:
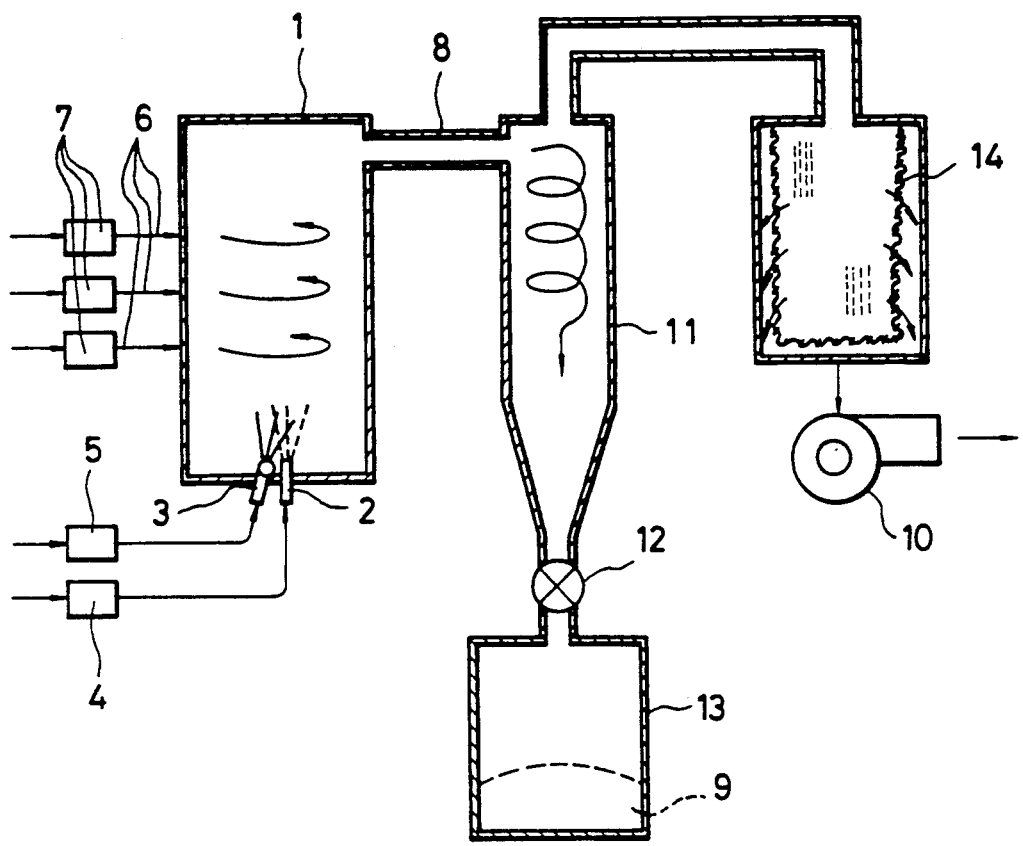
FIG. 1 is a schematic explanatory view showing an embodiment of the granulating and coating apparatus according to the present invention.
Figure 2:
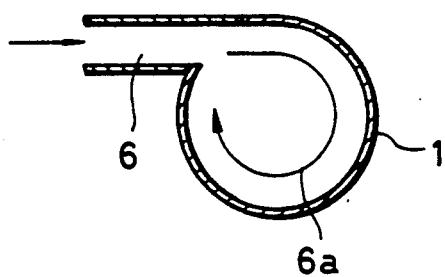
FIG. 2 is an explanatory view showing an example of the method of feeding drying air streams.

Referring to FIGS. 1 and 2, there is depicted a granulating and coating apparatus according to the invention including, a processing cylinder 1 as being a main body of the apparatus for performing therein granulating, coating, drying, etc. of a powdery or granular material. The cylinder 1 has a cylindrical shape in a horizontal cross-section as shown in FIG. 2 for example.

On a bottom wall of this processing cylinder, a spray nozzle, i.e. a powdery or granular material nozzle 2 (supply means) for feeding the powdery or granular material as being an article to be coated and a spray nozzle, i.e. a liquid nozzle 3 (supply means) for feeding a coating liquid as being a coating material are parallely provided at positions adjacent to each other and directed upward in the processing cylinder 1. Namely, these nozzles 2 and 3 are provided at positions where each air stream dispersed from the respective nozzle is not in contact with the other nozzle. In channels to the respective nozzles 2 and 3, respective compressed air sources 4 and 5 are provided separately, i.e. independently of each other in order to feed compressed air separately, i.e. independently of each other.

On the other hand, air-stream flow-in openings 6 for feeding drying air streams are opened at a side surface portion in the substantially intermediate area of the processing cylinder 1. The drying air streams are generally a hot air or cooled air. In each channel to the respective air-stream flow-in openings 6, there is independently provided flow-rate control means such as for example as damper which controls air flow rate to the respective air-stream flow-in openings 6 independently of one another.

In this embodiment, the air-stream flow-in openings 6 are provided at positions upwardly of the powdery or granular material nozzle 2 and the liquid nozzle 3, i.e. at the downstream side thereto, whereby the drying air streams are fed into the processing cylinder 1 after the article to be coated and the coating material have collided on each other in the directions of parallel flowing.

Furthermore, as shown in FIG. 2, the air streams from the air-stream flow-in openings 6 are supplied from directions tangent to the processing cylinder 1 of cylindrical shape, so that volute air streams 6a are formed in the processing cylinder. Because of these volute air streams, the contact time between the coated articles and the drying air is elongated, and adhesion of the powdery or granular material and the coating liquid to the inner wall surfaces of the processing cylinder 1 can be prevented.

Further, in the upper portion of the processing cylinder 1, there is opened a catching channel 8, and coated products 9, on which the treating such as granulating, coating, drying, etc. has been completed in the processing cylinder 1, are attracted from the interior of the processing cylinder 1 to the outside thereof through the catching channel 8 by an attracting force of a blower 10 or the like.

The products 9 attracted to the outside of the processing cylinder 1 through the catching channel 8, then, descend in a cyclone 11, pass through a rotary valve 12 and are caught by a receiving vessel 13. While, minute particles, dust, etc. not usable as the products do not descend in the cyclone 11 and are caught and removed by a bag filter 14.

The action of this embodiment will hereunder be described.

The powdery or granular material as being the article to be subjected to granulating and coating treatment and the coating liquid as being the coating material are blown out into the processing cylinder 1 through the powdery or granular material nozzle 2 and the liquid nozzle 3, respectively. At this time, the blow-out forces through the respective nozzles 2 and 3 are controlled independently of each other by regulating air pressures from the respective compressed air sources 4 and 5.

The article to be coated and the coating liquid are blown out toward the top wall of the processing cylinder 1, in flows air that are parallel to each other; Preferably, the article to be coated has a diameter of about 250 μm or less. The streams collide with each other, so that the coating liquid is uniformly coated around the articles, and granulating and coating are performed.

In that case, the coating liquid and the article to be coated are not blown out in the directions opposed to each other and not blown out to the inner wall surfaces of the processing cylinder 1, so that the blown-out force of either one of the coating liquid and the article does not become far larger or far smaller than the other, namely, adhesion of the coating liquid and the article to the inner wall surfaces of the processing cylinder 1 due to the imbalance of the blown out forces can be suppressed. Furthermore, the "spray-dry" phenomenon, where the coating liquid is accumulated itself and turned into the solid particles, can be suppressed.

On the other hand, in the processing cylinder 1, the drying air streams are fed through the air-stream flow-in openings 6 into a drying zone positioned upwardly of a coating zone formed by the nozzles 2 and 3. At this time, flow rates of the drying air streams from the respective air-stream flow-in openings 6 are controlled by the flow-rate control means 7 independently of each other.

By the supply of the drying air streams, the articles which have been coated with the coating material are dried to a desired dryness.

At that time, the drying air streams are supplied through the air-stream flow-in openings 6 in a direction tangent to the processing cylinder 1 as shown in FIG. 2, so that the contact time between the coated products and the drying air streams is elongated, and adhesion of the coating liquid and the articles to be coated to the inner wall surface of the processing cylinder 1 can be effectively suppressed by the forming of substantially volute air streams 6a.

As described above, the coating zone is formed by the blow-outs of the articles to be coated and the coating liquid through the nozzles 2 and 3. And, the drying zone is formed by the blow-out of the drying air streams through the air-stream flow-in openings 6. These two zones are separated, so that the spray-dry phenomenon, in which the coating liquid itself is accumulated and turned into the particles, can be prevented from occurring.

As described above, the coated products 9, on which granulating, coating and drying have been completed, are passed through the catching channel 8 from the processing cylinder 1 and attracted to the cyclone 11 under the attracting force of the blower 10.

In the cyclone 11, the non-defective products 9 having the given quality and the given quantity descend in the cyclone 11, are passed through the rotary valve 12 and received in the receiving vessel 13.

On the other hand, the minute particles, dust, etc. attracted into the cyclone 11 are further attracted into the bag filter 14 through the top portion of the cyclone 11 under the attracting force of the blower 10, caught by the bag filter 14 and removed to the outside of a system.

Figure 3:
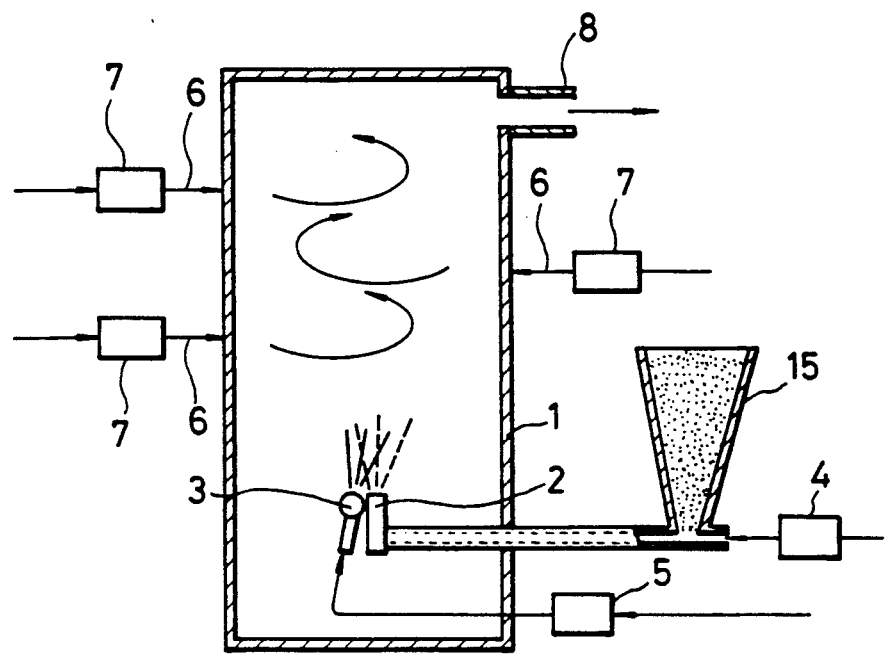
FIG. 3 is a schematic view showing the essential portions of the granulating and coating apparatus according to another embodiment of the invention.

FIG. 3 is a schematic view showing the essential portions of a second embodiment of the granulating and coating apparatus according to the present invention.

In this second embodiment, the article to be fed to the powdery or granular material nozzle 3 is stored in hopper 15, delivered under pressure to the powdery or granular material nozzle 2 by the blow-out force of compressed air from the compressed air source 4, and blown out into the processing cylinder 1 through the nozzle 2.

Furthermore, in this second embodiment, both of the powdery or granular material nozzle 2 and the liquid nozzle 3 are parallelly provided at adjacent positions and directed upwardly toward the top wall, in the bottom portion of the processing cylinder 1, not on the bottom wall itself of the processing cylinder 1. It goes without saying that, also in this second embodiment, the nozzles 2 and 3 are provided at adjacent positions where each air stream dispersed from the respective nozzles is not in contact with the other nozzle.

Further, in this second embodiment, the air-stream flow-in openings 6 are disposed to feed the drying air streams into the processing cylinder 1 in the the opposed directions to each other, not in the same directions.

In this second embodiment also, the coating zone formed by the nozzles 2 and 3 and the drying zone formed by the drying air streams are separated and the air-stream flow-in openings 6 for the dry air streams are provided on the way from the completion of coating to the catching, so that such disadvantages can be reliably controlled as adhesion of the coating material and the article to be coated to the inner wall surfaces of the processing cylinder 1 and turning the coating material into the particles due to the spray-dry phenomenon.

Figure 4:
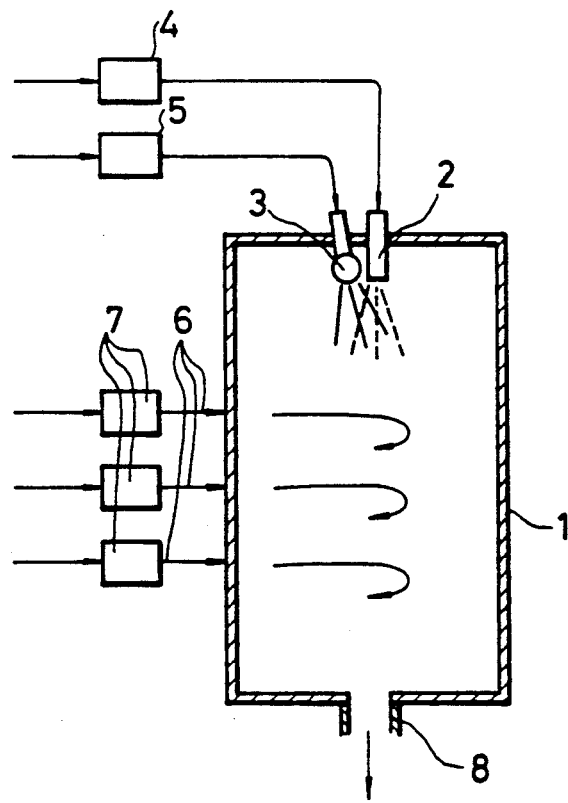
FIG. 4 is a schematic sectional view showing the essential portions of a further embodiment of the granulating and coating apparatus according to the invention.

FIG. 4 is a schematic sectional view showing the essential portion of a third embodiment of the granulating and coating apparatus according to the present invention.

In this third embodiment, the powdery or granular material nozzle 2 and the liquid nozzle 3 are provided at the top wall of the processing cylinder 1, not at the bottom wall, and are directed downward.

Furthermore, in accordance with the nozzles 2 and 3 directed downward, the catching channel 8 is provided at the bottom portion of the processing cylinder 1, and the air-stream flow-in openings 6 are opened between the nozzles 2, 3 and the catching channel 8.

The nozzles 2, 3, the air-stream flow-in openings 6 and the catching channel 8 are arranged conversely in the vertical direction between this third embodiment and the first and second embodiments. However, coating, drying, and the like of the article to be coated and the coating material are identical in order with those in the second embodiments. And, such functional effects as prevention of adhesion of the coating material and the like to the inner wall surfaces of the processing cylinder 1 and prevention of turning the coating material into the solid particles can be obtained similarly to the first and second embodiments.

The invention achieved by the present inventor has been described in detail with reference to the embodiments, however, the present invention should not be limited to the above embodiments and is variable in many ways with a scope of the invention.

For example, the positions of installation of the nozzles 2, 3 and the catching channel 8 and the directions of the air-stream flow-in openings 6 may be changed into those other than in the above embodiments.

Furthermore, the number of the air-stream flow-in openings 6 may be one or a plural number.

Further, the sectional shape of the processing cylinder 1 should not be limited to that in the above embodiments.

The forgoing description has been given of the case where the invention achieved by the present inventor is applied to granulating, coating and drying of the pharmaceuticals, food products, beauty preparations and chemical products which are included in the field of applicability, however, the application of the invention should not be limited to this, and the invention is applicable to granulating, coating, drying and so on of other materials.

The following is the brief description of the advantages obtained by the typical invention out of the inventions disclosed in the present application.

The drying air-stream flow-in openings are provided on the way from the collision of the article and the coating material to the catching, whereby the article to be coated and the coating material are not blown out to the opposed inner wall surfaces from the directions opposed to each other and the parallel flows are formed, so that adhesion of the coating material and the article to be coated to the opposed inner wall surfaces of the processing cylinder due to the imbalance of the opposed blow-out forces and solidification thereon can be suppressed.

The coating zone and the drying zone are separated, whereby, the "spray dry" phenomenon where the coating material itself is accumulated and turned into the solid particles is prevented. Therefore, the reliable granulating and coating can be performed.

Respective means for supplying the article to be coated and the coating material use the compressed air independently from each other. And, the respective supply means can be adjusted independently of each other, thus enabling to obtain the optimum blow-out forces.

The means for supplying the article to be coated and the coating material are parallelly provided at the adjacent positions where the air stream dispersed from respective means is not in contact with the other supplying means, so that the parallel flows are formed in the processing cylinder and adhesion of the coating material and the like to the inner wall surfaces of the processing cylinder can be more reliably suppressed.

A section of the channel from the collision of the article to be coated and the coating material to the catching thereof is substantially circular, and the flow-in direction of the drying air streams are tangent to the circular section, so that the contact time between the coated article and the drying air streams can be elongated. And moreover, adhesion of the coating material and the like to the inner wall surface can be more effectively suppressed by the formation of the substantially volute air streams.

When, at least two drying air-stream flow-in openings are provided and each of the openings is provided with a means for independently controlling the air flow rate, the optimum drying can be made by the optimum flow rate at all times by the independent control of the air flow rates from the respective flow-in openings.

What is claimed is:

1. A coating apparatus comprising:
   a vessel;
   first means for supplying a flow of an article to be coated in a first direction into said vessel;
   second means for supplying a flow of a coating material into said vessel, said said second means being disposed so that the coating material flows substantially in said first direction and collides with said article flow at a downstream location from said first and second means; and,
   means for supplying at least one air stream of drying air into said vessel, said air stream being in a second direction substantially perpendicular to said first direction and downstream of said collision location.

2. The coating apparatus as set forth in claim 1, wherein:
   said means for supplying the article to be coated and said means for supplying coating material use compressed airs independently from each other.

3. The apparatus in accordance with claim 1 wherein said air stream enters said vessel at a location where said vessel has a substantially circular cross-section and said air stream enters said vessel in a flow substantially tangent to said circular section.

4. The coating apparatus as set forth in claim 3, wherein:
   at least two drying air-stream flow-in openings are provided, and each of which is provided with respective means for independently controlling an air flow rate of the respective opening.

5. A coating method comprising:
   supplying a flow in a first direction of an article to be coated into a vessel;
   supplying a flow of a coating material into said vessel, said coating material flow being substantially in said first direction and colliding with said article flow at a downstream location; and, supplying at least one air stream of drying air into said vessel, said air stream being in a second direction substantially perpendicular to said first direction and engaging said article and coating material flows downstream of said collision location.

6. The granulating and coating method as set forth in claim 5, wherein:
a mean particle diameter of said article to be coated is about 250 μm and therebelow.

* * * * *